Patented Dec. 19, 1950

2,534,905

UNITED STATES PATENT OFFICE 2,534,905

DISTILLATION OF FLUOROHYDROCARBONS

Alvin H. Friedman, Bartlesville, Okla., assignor to Phillips Petroleum Company, a corporation of Delaware No Drawing. Application July 2, 1945, Serial No. 602,920

10 Claims. (Cl. 202—50)

This invention relates to the manufacture of organic halogen compounds. In one particular aspect, this invention relates to the isolation and purification of halogenated hydrocarbons. More particularly in this aspect, this invention relates to the isolation of fluorohydrocarbons from a reaction effluent in the manufacture of fluorohydrocarbons. In another aspect this invention relates to a method for the fractional distillation of a hydrocarbon and an alkyl fluoride to separate the same.

As is well-known, fluorohydrocarbons may be prepared by various methods. Among these are the action of hydrogen fluoride on unsaturated hydrocarbons, on halohydrocarbons, on alcohols, and the like; the action of elementary fluorine on hydrocarbons or halohydrocarbons; the replacement of other halogens in the halohydrocarbons with fluorine from fluorides of various metals or metalloids, such as mercury, lead, boron, arsenic, thallium, zinc, silver, and the like; and the reaction of hydrocarbons with fluorinating agents of the type of iodine pentafluoride. No matter what particular method of preparation is used, the resulting reaction mixture must be treated to isolate the desired fluorohydrocarbon by separating it from by-products and unconsumed reactants. The isolation generally involves fractional distillation, which, however, is troublesome since the fluorohydrocarbon undergoes decomposition and the distillate becomes contaminated with hydrogen fluoride and with unsaturated hydrocarbons formed by the decomposition. Although fluorocarbons, which contain only carbon and fluorine, are stable and do not liberate hydrogen fluoride, many alkyl fluorides, especially those having an alkyl group of more than three carbon atoms, are relatively so unstable, especially in the presence of a trace of hydrogen fluoride, that they decompose to an undesirable extent, or even substantially completely, into hydrogen fluoride and the corresponding olefin when distilled in the ordinary manner. This tendency to decompose upon distillation increases with the structural complexity of the fluorohydrocarbon and becomes very pronounced in the secondary and tertiary fluorides such that it is very difficult to isolate such compounds.

In general, the alkyl fluorides, having an alkyl group of more than 3 carbon atoms, are less stable and are more difficult to prepare and to isolate than the other alkyl halides. For example, when a butyl or amyl fluoride is prepared by the reaction of hydrogen fluoride and the corresponding olefin, many undesirable by-products are produced. The reaction mixture produced contains, besides the desired fluoride and its isomers, unreacted olefin and a heavy polymer or oil, which consists of polymers of the original olefin or olefins and some heavy fluorides. When an attempt is made to separate the desired fluoride from this reaction mixture by distillation, either at or above atmospheric pressure, or in a vacuum, hydrogen fluoride is liberated. The liberated hydrogen fluoride accelerates the decomposition of the alkyl fluoride so that the yield is markedly decreased; in many cases, the yield becomes practically nil because substantially all of the product becomes decomposed. When the apparatus in which the distillation is carried out is of glass or metal or other easily corroded material, the apparatus is damaged or destroyed by the corrosive action of the hydrogen fluoride liberated by the decomposition.

The object of this invention is to provide an improved method of manufacturing halogenated hydrocarbons.

An object of this invention is to provide an improvement in the art of purification and/or isolation of fluorohydrocarbons.

Another object of this invention is to provide an improved method for distilling fluorohydrocarbons.

Still another object of this invention is to provide a method for preventing or minimizing decomposition of fluorohydrocarbons during distillation, especially of alkyl fluorides.

Still a further object is to provide a method for fractionally distilling a mixture of hydrocarbons and fluorohydrocarbons to separate the same.

Other objects and advantages will become apparent to those skilled in the art from the following description and disclosure.

Much to my surprise, I have discovered that this troublesome decomposition of the fluorohydrocarbons can be avoided by adding water to the mixture being distilled. Normally, it would be expected that the water, because of its well-known affinity for hydrogen fluoride, and also because many fluorohydrocarbons, especially the alkyl fluorides, are commonly supposed to be easily hydrolyzed, would cause the fluorohydrocarbon to decompose. On the contrary, I have found that in the presence of sufficient water to form a separate aqueous layer or phase in the distillation zone, the distillation of the fluoride goes smoothly and with exceedingly little or no decomposition; and, in consequence, the yield of purified or isolated fluoride is excellent. In the preferred embodiment of this invention about one fourth to about one third of the liquid volume in the distillation zone should comprise a separate layer of water; however, in general, a sufficient amount of water to assure a separate liquid phase is adequate to prevent decomposition of the fluorohydrocarbon. Although the action of the water is not clearly understood at present, I believe that the water saturates the distillation mixture and instantly removes any trace of hydrogen fluoride that may be formed, thereby obviating the hydrogen fluoride-catalyzed decomposition which takes place in the absence of water. It is possible that the water converts the hydrogen fluoride to a catalytically inactive hydroxonium fluoride; however, it is also possible that the water may act in some other way, such as removing or inactivating some impurity that catalyzes the decomposition. The above is offered only as a possible explanation for the action of the water and the invention is not to be limited by such theory; it being sufficient that the presence of water accomplishes the desired result.

More specifically, I have found that when water or an aqueous solution, which may be either acidic or basic, is present in a distillation mixture as a separate liquid phase, I can distill the mixture containing an alkyl fluoride, such as butyl fluoride, etc., substantially without decomposition of the fluoride, whereby the alkyl fluoride is obtainable in relatively high yield and in relatively high purity. Preferably, the water phase is maintained neutral or basic by adding a basic compound or buffer thereto. Such basic compounds include sodium and potassium hydroxide, ammonium hydroxide, and the like, and the buffer may comprise those buffer compounds and mixtures well known in the art, such as acetic acid, borax, sodium bicarbonate, etc. Specifically the temperature of distillation will depend upon the particular mixture being distilled, but, in general, when a separate aqueous phase (two-phase system) exists in the distillation zone, the distillation temperature will be constant and usually at a temperature below about 80° C.

In most instances, when distilling a mixture containing a fluorohydrocarbon, the fluorohydrocarbon passes overhead from the distillation zone as the principal component of the overhead product. However, where the impurities in the mixture are substantially lower-boiling than the fluorohydrocarbon, the overhead product comprises principally the impurities and the kettle product comprises principally water and the fluorohydrocarbons. Since the fluorohydrocarbons are relatively immiscible with the water phase, the fluorohydrocarbon in the kettle product is easily separated from the water by gravity separation.

The improved process of this invention can be utilized either batch-wise or continuously. Furthermore, if one distillation does not isolate the fluorohydrocarbon in a desired degree of purity, the separation of fluorohydrocarbon may be accomplished by repeated distillation or by a series of successive fractional distillations. Ordinarily one distillation in the presence of water effects sufficient purification so that the fluorohydrocarbon can be subsequently re-distilled without the presence of added water. Thus, in many cases it may be highly desirable when further purifying the fluorohydrocarbon by a second or further distillation to dry or render the fluorohydrocarbon fraction from the first distillation free from water to minimize corrosion in subsequent distillations.

Although the invention can be utilized for the purification or isolation of any fluorohydrocarbon, it is especially advantageous for the isolation of alkyl fluorides that have more than three carbon atoms per molecule, such as the various butyl, amyl, hexyl, and heavier fluorides as explained hereinbefore. However, I do not wish to exclude the relatively more stable and lighter alkyl fluorides, such as normal and isopropyl fluorides, for the isolation of which my invention is of some, though smaller, advantage. Similarly, this invention applies equally well to fluorohydrocarbons other than alkyl fluorides, such as aryl fluorides, aralkyl fluorides, alkenyl fluorides, cyclo-fluorohydrocarbons, and the like; particular examples of such fluorohydrocarbons are phenyl fluoride, benzyl fluoride, vinyl fluoride, and cyclohexyl fluoride, respectively.

*Example*

A mixture of secondary butyl fluoride and by-products, principally polymers, was obtained by mixing equimolar amounts of butene-2 and hydrogen fluoride in a stirred reactor at about 38° C. This material was washed with cold sodium hydroxide solution and was placed in a distillation flask. In an attempt to distill the butyl fluoride, it was found that, upon heating, hydrogen fluoride fumes shortly began to come off; soon, as the hydrogen fluoride became progressively more abundant, it became necessary to stop the distillation and to discard the mixture as the result of the liberation of free hydrogen fluoride. A similar reaction mixture subjected to vacuum distillation gave similar results, and, although the decomposition appeared somewhat delayed, it was not lessened.

Another reaction mixture, prepared in the same way, was placed in a distillation flask with about a third of its volume of water. This mixture was readily distilled with no evidence of decomposition. A separate aqueous phase existed during the distillation, and the temperature remained relatively constant at about 24 to 25° C. When substantially all of the secondary butyl fluoride was distilled off, the distillation temperature gradually rose. The distillation was carried to about 70° C., when all the secondary butyl fluoride, which boils at about 25° C., was considered to be distilled off. The condensed distillate, without being dried, was fractionally re-distilled in a glass fractionating column packed with glass helices, and the fraction boiling within the range of about 24.5 to 25.5° C. was isolated. This fraction, when dried, proved to be practically pure (99%) secondary butyl fluoride; its only impurity appeared to be a trace of butene-2.

The residue of water and polymer in the distillation flask was separated and the aqueous layer was found to be slightly acidic, indicating that some acid material was removed by the water present in the distillation flask. It was also noted that the slight acidity of the water layer was not sufficient to be objectionably corrosive, and in fact, the distillation mixture was less corrosive than when no water was added during distillation.

Various modifications and other applications of my invention will become apparent to those skilled in the art which will be within the scope of my invention.

Having described my invention, I claim:

1. The process of separating a relatively unstable fluorohydrocarbon which decomposes during distillation from a mixture containing the same, which comprises introducing sufficient water into a distillation zone to maintain a separate liquid aqueous phase with said fluorohydrocarbon, distilling said mixture with substantially no decomposition of said fluorohydrocarbon, and recovering a purified fluorohydrocarbon from said distillation.

2. The method according to claim 1 in which said fluorohydrocarbon is an alkyl fluoride.

3. The method for separating butyl fluoride from a mixture containing the same, which comprises distilling the mixture containing the butyl fluoride in the presence of a separate liquid aqueous phase and recovering a purified butyl fluoride from said distillation.

4. The method according to claim 1 in which said fluorohydrocarbon is an alkenyl fluoride.

5. The method according to claim 1 in which said fluorohydrocarbon is vinyl fluoride.

6. The method according to claim 1 in which said fluorohydrocarbon is an aralkyl fluoride.

7. The method according to claim 1 in which said fluorohydrocarbon is benzyl fluoride.

8. A process for the separation of butyl fluoride from an impure mixture containing the same, which comprises introducing sufficient water into a distillation zone to maintain a separate liquid aqueous phase with said butyl fluoride, distilling said mixture between about 25 and 70° C., condensing the vaporous overhead product, re-distilling said condensed overhead product at a temperature of about 25° C., and recovering said butyl fluoride.

9. A process for separating a relatively unstable alkyl monofluoride which has an alkyl group of more than three carbon atoms and which decomposes during distillation from a mixture containing the same, which comprises introducing sufficient water into a distillation zone to maintain a separate liquid aqueous phase with said alkyl fluoride, distilling said mixture with substantially no decomposition of said alkyl fluoride, and recovering a purified alkyl fluoride from said distillation.

10. A process according to claim 1 in which said fluorohydrocarbon is an alkyl fluoride in which the alkyl contains more than three carbon atoms.

ALVIN H. FRIEDMAN.

REFERENCES CITED

The following references are of record in the file of this patent:

UNITED STATES PATENTS

| Number | Name | Date |
|---|---|---|
| 2,000,881 | Coleman | May 7, 1935 |
| 2,069,711 | Missbach | Feb. 2, 1937 |
| 2,120,668 | Hanson | June 14, 1938 |
| 2,231,026 | Quattlebaum | Feb. 11, 1941 |
| 2,341,140 | Engs | Feb. 8, 1944 |
| 2,364,587 | Morris | Dec. 5, 1944 |
| 2,364,818 | Renoll | Dec. 12, 1944 |
| 2,396,600 | Pacevitz | Mar. 12, 1946 |
| 2,398,181 | Johnson | Apr. 9, 1946 |
| 2,402,785 | Spealman | June 25, 1946 |

OTHER REFERENCES

Finger and Reed; Some Anomalous Properties of Organic Fluorine Compounds; Transactions of the Illinois State Academy of Science; vol. 29 (1936), pages 89, 90, 91.